3,448,339
STORED ELECTRICAL ENERGY CIRCUIT WITH SAFETY INTERLOCKS
William C. Maithonis, Los Angeles, and Stephen A. Barlow, Altadena, Calif., assignors to Lockheed Aircraft Corporation, Burbank, Calif.
Filed May 13, 1966, Ser. No. 549,925
Int. Cl. H02h 7/16
U.S. Cl. 317—9                                    11 Claims

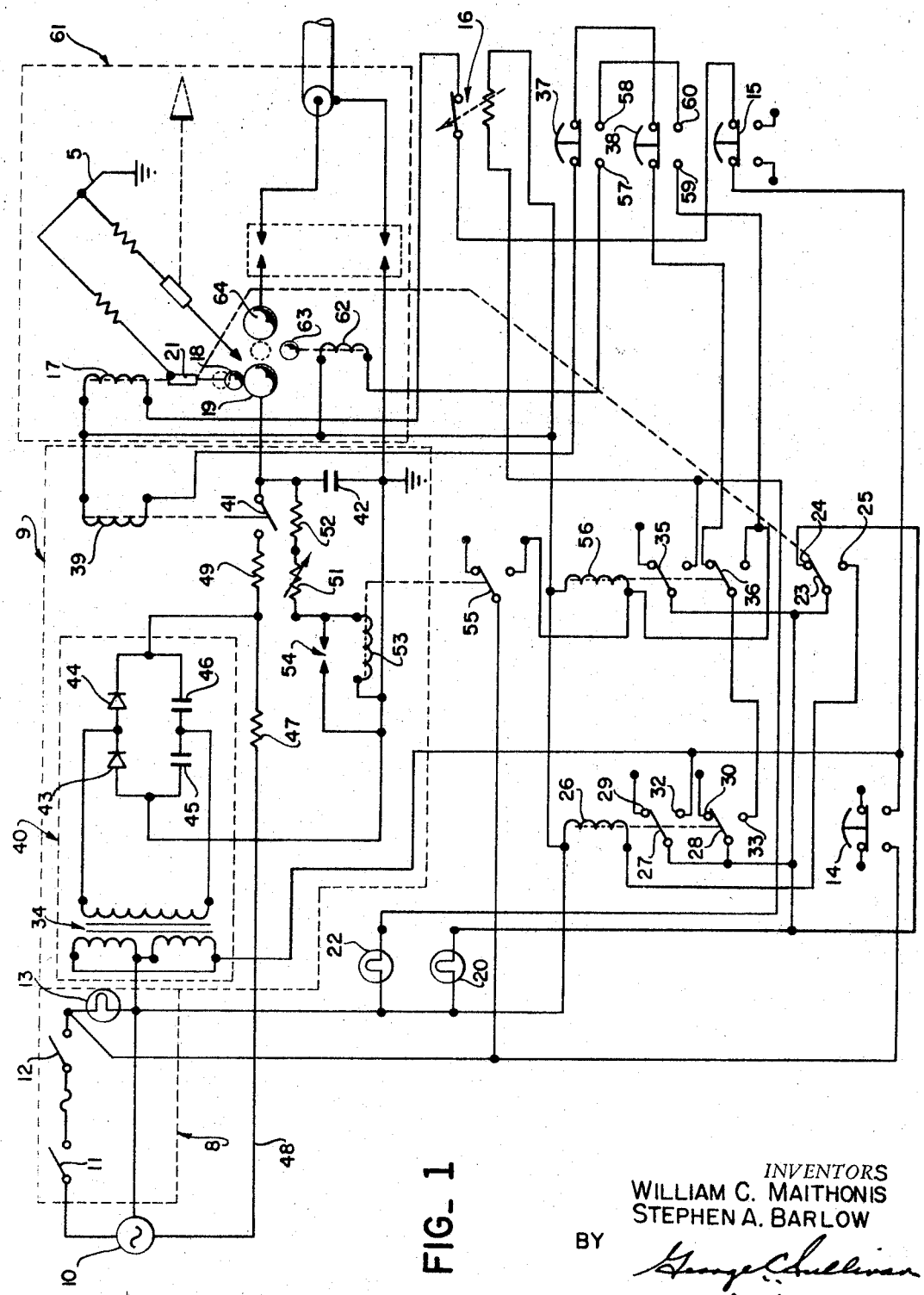
FIG_1
INVENTORS
WILLIAM C. MAITHONIS
STEPHEN A. BARLOW

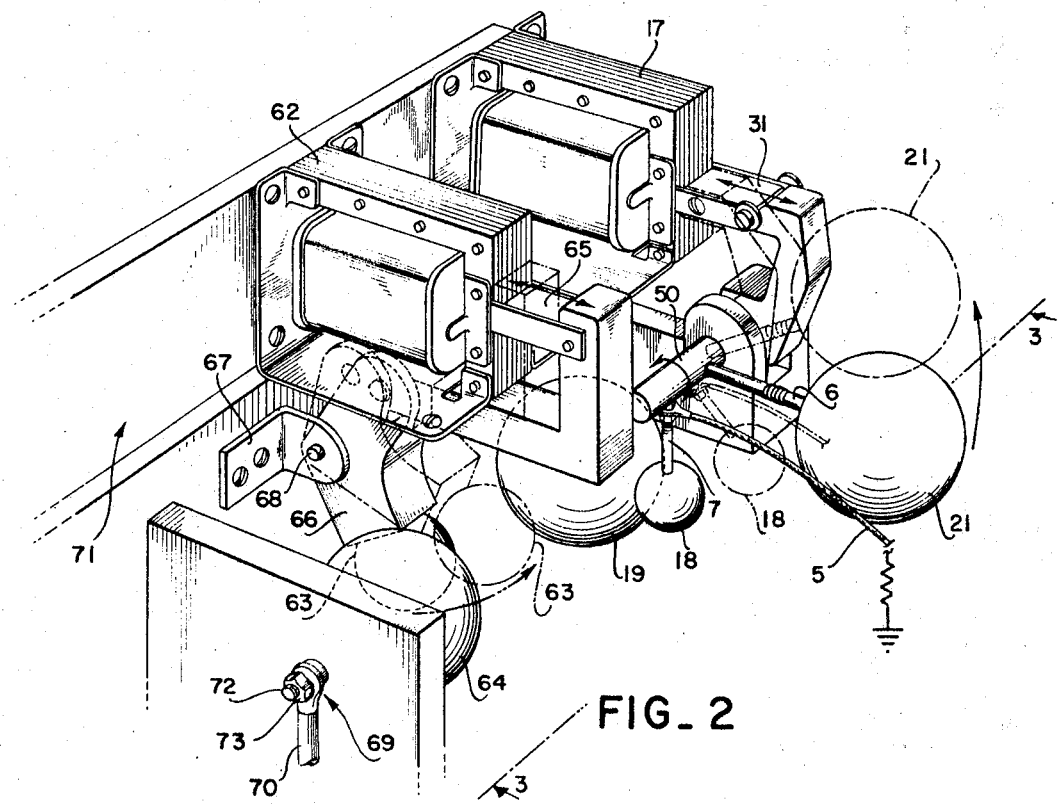
FIG_2
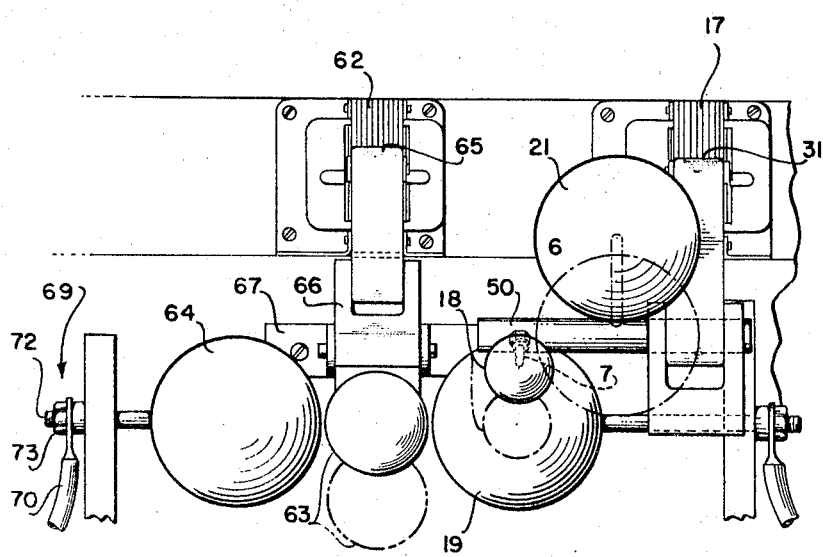
FIG_3
INVENTORS
WILLIAM C. MAITHONIS
STEPHEN A. BARLOW
BY
Agent United States Patent Office
3,448,339
Patented June 3, 1969

ABSTRACT OF THE DISCLOSURE

The electrical energy storage device comprises a bridge-doubler rectifier which charges a storage capacitor through an interlocked safety control system. Upon command, stored energy in the range of 10,000 joules may be discharged into an external utilization circuit in a pulse having a duration of one to four microseconds. A control circuit regulates the level of the stored energy. If the stored energy is not utilized within a given operating period, or if the system is to be shut down prior to the utilization of the stored energy, the storage capacitor is automatically and safely discharged to ground.

This invention relates generally to an electrical energy storage device, and more particularly to a device of this kind which is portable and which has an improved circuit for furnishing a very high energy pulse to utilization means, such as a magnetic circuit or an electrical detonator circuit.

At the present time, high energy secondary chemical explosives are generally initiated by primary explosive detonating caps. Because of the obvious hazards involved, extreme precautions must be taken while using these detonating caps due to their susceptibility to shock, electromagnetic energy and stray voltages. For this purpose, a cap consisting of an electrical bridgewire primed with pentaerythrite tetranitrate (PETN) has been developed and is disclosed in patent application Ser. No. 422,989, "Exploding Bridge Wire Initiator," by G. N. Rardin, of common assignee. This cap or initiator is suitable for use with both stable and unstable secondary explosives, and is unusually insensitive to environmental hazards.

As a means for exploding initiator bridgewires, capacitor discharge of electricity has progressed from a laboratory phenomenon to an accepted production process. For example, in place of the conventional blasting cap used in the explosive separation of missile stages, exploding bridgewires actuated by capacitor discharge now do a better job without the hazard of premature explosion from heat, stray current, static or radar.

Until now, however, the other uses of such an initiator have been severely limited due to the size and weight of the energy source required to explode the bridgewire. Therefore, while such an initiator might be used to excellent advantage in areas of high radiant energy (e.g., construction sites), its usage has been necessarily confined to those areas which are readily accessible to a heavy (typically 2,000 lbs.–4,000 lbs.) console type of unit. By being able to use a comparatively lightweight (in the order of 190 lbs.) unit, the usage of the bridgewire initiator may be greatly enhanced.

The necessity of the heavier, console unit has been dictated by the energy losses incurred in the transmission line from the discharge unit to the initiator. In any bridgewire system, it is extremely important that the wire be caused to explode rather than burn to avoid the undesirable fusing effect of the materials involved. Therefore, the energy reaching the bridgewire must be sufficient to explode rather than merely burn it. In the past this has required heavy capacitor units capable of storing large amounts of energy (of the order of 10,000 joules).

For example, one such use of bridgewire initiators in which heavy console units have been previously required is in explosive forming. It has been found that unless the initiator wire is exploded, an undesired gradient effect is produced resulting in a non-uniform pressure front. The pressure front has been found to be a direct function of the charge container shape and the method used to initiate detonation.

Concerning the method of detonation, it has been determined that the energy required to explode the bridgewire is a function of the switching time characteristics of the system. In the past, fragile vacuum switches weighing in the order of 1,000 lbs. (including necessary power supplies, etc.) have been used. These switches produced a useable pulse of approximately 5 to 10 microseconds duration at the bridgewire, resulting in heat in the order of 3,000° F.

In the improved capacitor discharge device of the present invention, there is provided a switching means having a pulse switching duration of 1 to 4 microseconds, which produces a temperature in the range of 12,000° F. at the bridgewire. This switch is considerably lighter in weight than conventional switches and is capable of conducting energy in the range of 10,000 joules.

It is, therefore, a primary object of the invention to provide a short duration, high-energy source of power.

Another object is to provide a safe, portable, high-energy storage device capable of energizing exploding bridgewire initiators.

Still another object of the invention is to provide a short-duration power source for explosive forming.

Another object is to provide a novel and improved switching circuit to deliver a short-duration, high-energy pulse.

These objects, and other features and advantages of this invention will become readily apparent from the following description and accompanying drawings in which:

FIGURE 1 is a schematic circuit diagram of one embodiment of the invention;

FIGURE 2 is a fragmentary perspective view of the trigger switch portion of the invention, showing the switch in the open position; and FIGURE 3 is a view taken along line 3–3 of FIGURE 2 showing the switch in the closed position.

Referring now to FIGURE 1, a preferred embodiment of the capacitor discharge device is shown in which the electrical energy for detonating blasting caps is adapted to be supplied by any suitable prime source 10 of alternating current.

Power from the alternating current source 10 is initially received by an interlock arming circuit 8, which comprises an interlock switch 11, an interlock arming switch 12 and an arming indicator light 13.

By closing the interlock switch 11 and the interlock arming switch 12, electrical energy is supplied to the interlock arming circuit 8. When this circuit is energized the arming indicator light 13 glows to warn the operator that a charging circuit 9 is ready to be energized. For added protection the interlock arming switch 12 may be key operated to insure that the device is not accidentally energized or energized by unauthorized personnel.

The charging circuit 9 comprises sequentially acting relays which apply a rectified current into an energy storing capacitor network. The charging level of this network is effectively sensed and controlled by a bleeder and discharge circuit which safeguards the possibility of overloading the system.

When the operator desired to charge the circuit, momentary depression of the manually-operated charging switch 14 causes energy to be supplied to the charging circuits in the sequential manner to be described hereinafter.

Initially, upon the momentary closing of the charging switch 14 energy is supplied across the abort control switch 15 which is shown in a first selected position, connecting the charging switch 14 with a time-delay relay 16. Time-delay relay 16 introduces a delay such that after a predetermined interval this relay will open causing the energy stored in the energy storing network to be discharged.

Time-delay relay 16 controls actuating solenoid 17 which forms an integral operating part of a trigger switch mechanism 61 illustrated in FIGURES 2 and 3.

Energizing actuating solenoid 17 will cause solenoid arm 31 to move to a retracted position, thereby allowing charging circuit network 9 to be energized. The lower end of the solenoid arm 31 is rotatably attached to the mounting frame 71 by means of an insulating connecting element 50, such that when solenoid arm 31 is moved by the actuating solenoid 17, arm 31 rotates the connecting element 50.

Safety grounding terminal 18 and grounding lead 5 are attached to the insulating connecting element 50 by means of connecting rod 7. When actuating solenoid 17 is de-energized, grounding terminal 18, urged by a moment supplied by weight 21 which is attached to the insulating connecting element 50 by connecting rod 6, makes contact with the discharge terminal 19, and discharges the capacitor 42 through grounding lead 5.

Upon the momentary depression of the charging switch 14, the abort indicator light 20 extinguishes due to the closing of a switch 23 which is controlled by the actuating solenoid 17. As switch 23 moves from the switch terminal 24 to the switch terminal 25 relay coil 26 will be energized. As the relay coil 26 is energized it causes relay switches 27 and 28 to move away from their normally open positions 29 and 30 to closed positions 32 and 33, respectively.

The closing of the relay switch 27 electrically connects the alternating current source 10 to the primary windings of a transformer 34. Similarly, switch 28 electrically connects the alternating current generator 10 to a switch 36 firing switches 37 and 38 which are in the normally closed position.

Firing switches 37 and 38 are connected in series so that it is necessary for the capacitor discharge device operator to depress both switches simultaneously before the firing circuit will discharge the stored electrical energy.

The firing switches 37 and 38 are electrically connected to a capacitor charging network relay 39. When energized, the relay 39 causes a charging network switch 41 to move from its normally-open position to a closed position, thereby connecting the charging circuit network 9 to the alternating current source 10.

A capacitor 42 starts its charging cycle as the charging network switch 14 is closed and receives electrical charge from the alternating current source 10 through a high-voltage bridge-doubler circuit 40. The high-voltage bridge-doubler circuit 40 comprises the transformer 34, diodes 43 and 44, and capacitors 45 and 46.

A resistor 47, connected to the high-voltage bridge-doubler network 40, acts as a power supply bleeder through a common return line 48, and in conjunction with a resistor 49 acts to limit the amount of current drawn by the capacitor 42 to a value determined by the circuit constants. The charging level in the capacitor 42 is sensed by a variable overload charging network resistor 51 and an overload charging network resistor 52 which are electrically connected to the coil of a current relay 53.

The variable overload charging network resistor 51 may be manually set to any predetermined value to limit the desired charge level in the capacitor 42 by controlling the current flow through the current relay 53.

An additional safety feature is provided by a spark gap 54 which is connected across the current relay 53 and which will prevent the capacitor 42 from building up to an excessive voltage level, should the coil of the relay 53 open.

As the capacitor 42 reaches the desired charge level, previously set by the variable charging network resistor 51, the coil of the current relay 53 energizes, thereby causing a switch 55 to close from its normally-open position. The closing of the relay 53 electrically connects the alternating current source 10 to the coil of relay 56 causing the switches 35 and 36 to close. This action allows the capacitor charging network relay 39 to release, thereby opening the charging circuit input network connected to the capacitor 42.

Accidental depression of firing switches 37 and 38 at any point of time prior to the above-described action only momentarily de-energizes the capacitor charging network relay 39, but creates no further action.

As the relay 56 is energized, the switch 35 connects the time delay relay 16 to the alternating current source 10 and simultaneously energizes a ready indicator light 22.

In cases of failure or emergency, the abort control switch 15 may be pushed to selectively clear the circuit of charge at any time prior to the closing of the firing switches 37 and 38. This clearing is accomplished by the de-energization of the actuating solenoid 17 which causes the capacitor 42 to be grounded through the discharge terminal 19 to the safety grounding terminal 18.

If for some reason the electrical bridgewire fails to detonate, or the firing switches 37 and 38 are not closed within a pre-selected time interval, time-delay relay 16 opens, causing capacitor 42 to be discharged to ground through the safety grounding terminal 18.

When the operator desired to produce a high-energy, short duration pulse such as is required to detonate an electrical bridgewire initiator or to energize the primary winding of a transformer for magnetic forming, a concurrent closing of the firing switch 37 across terminals 57 and 58 with the closing of the firing switch 38 across terminals 59 and 60 causes the firing solenoid 62 to be energized.

As shown in FIGURES 1, 2 and 3, the actuation of the firing solenoid 62 mechanically positions the connecting terminal 63 substantially equidistant between the discharge terminal 19 and the output terminal 64. The terminals are preferably spherically shaped and have a brazed silver-alloy coating comprising approximately 70% silver and 30% copper.

The connecting terminal 63 is insulated from the capacitor discharge network by an insulating arm 66 which is rotatably connected to the mounting frame 71 by means of a bracket 67 and a rotatable connecting element 68. As the firing solenoid 63 is energized, it causes a solenoid arm 65 to retract until the firing solenoid 62 is again de-energized. The solenoid arm 65 is rotatably linked to the arm 66 such that as the solenoid arm 65 moves, it causes the arm 66 to rotate about the connecting element 68.

When the firing solenoid 62 is energized, the connecting terminal 63 which is mounted to the arm 66 moves between the discharge terminal 19 and the output terminal 64. The connecting terminal 63 is positioned near enough to the discharge terminal 19 and to the output terminal 64 to allow the generation of plasma discharge paths therebetween for the most efficient energy discharge path. The connecting terminal 63 need not at any time contact any of the other terminals.

In order to minimize the power losses over the discharge path, the output terminal 64 and the discharge terminal 19 are adjustably connected to the mounting frame 71. For this purpose a threaded rod 72 is connected to the discharge terminal 19 and to the output terminal 64 for attachment to the mounting frame 71. A nut 73 engages the threaded portion of the rod 72 to secure it to the mounting frame 71 and to the lead connectors 70.

If desired, a spacer 69 of pre-selected width may be utilized to adjust the gap between the discharge terminal 19 and the connecting terminal 63 and between the output terminal 64 and the connecting terminal 63.

Obviously, many modifications and variations of the present invention are possible in the light of the above teachings. It is therefore to be understood that within the scope of the appended claims the invention may be practiced otherwise than as specifically described.

We claim:

1. An electrical energy storage device, comprising:
   an interlock arming means for receiving electrical energy;
   charging circuit means including a high-voltage bridge-doubler circuit for voltage rectification, connected to said interlock arming means for storing energy received therefrom;
   switching means having a discharge terminal connected to said charging means, an output terminal for connection to an external utilization circuit, and a selectively-operable connecting terminal; and
   discharge control means operatively connected to said connecting terminal for selectively causing said switching means to discharge the energy stored in said charging circuit means into said output terminal.

2. An electrical energy storage device as defined in claim 1 including:
   abort control means selectively connectable to said discharge terminal for discharging said charging circuit means, said abort control means comprising
      a spring-return abort switch having a first selective position wherein said charging circuit means is connected to said discharge control means and which is selectively movable to a second position to disconnect said charging circuit means from said discharge control means.

3. An electrical energy storage device as defined in claim 7 wherein said charging circuit means includes:
   a resistance-capacitance network connected across the output of said high-voltage bridge-doubler circuit for controlling the amount of energy stored in said capacitor.

4. An electrical energy storage device as defined in claim 1 wherein said discharge control means includes:
   a first spring-return firing switch connected to said discharge control means; and
   a second spring-return firing switch connected in series with said first spring-return firing switch for operating said discharge control means in response to the concurrent closure of said first and second firing switches.

5. An electrical energy storage device as defined in claim 1 wherein said output terminal, said connecting terminal and said discharge terminal each are substantially spherical in shape.

6. An electrical energy storage device as defined in claim 1 including means movably mounting said output terminal and said discharge terminal, thereby permitting the distance therebetween to be selectively varied.

7. An electrical energy storage device as defined in claim 1 including:
   an actuating means connected to said discharge control means; and
   a safety grounding terminal mounted on said actuating means, said safety ground terminal being selectively movable to a first position whereby the energy stored in said charging circuit means is discharged from said discharge terminal to said safety grounding terminal.

8. A safety electrical energy storage apparatus comprising:
   an interlock arming means for receiving electrical energy;
   charging circuit means connected to said interlock arming means for storing energy received therefrom, said charging circuit means including a spring-return charging switch selectively movable to a first position whereby said interlock arming means is disconnected from said charging circuit means, and is selectively movable to a second position to connect said interlock arming means to said charging circuit means;
   switching means having a discharge terminal connected to said charging circuit means, an output terminal for connection to an external utilization circuit, and a selectively-operable connecting terminal;
   discharge control means operatively connected to said connecting terminal for selectively causing said switching means to discharge the energy stored in said charging circuit means into said output terminal, said discharge control means including a first spring-return firing switch connected to said discharge control means, and a second spring-return firing switch connected in series with said first spring-return firing switch for operating said discharge control means in response to the concurrent closure of said first and second firing switches;
   abort control means selectively connectable to said discharge terminal for discharging said charging circuit means, said abort means including a spring-return abort switch having a first selective position wherein said charging circuit means is connected to said discharge control means and which is selectively movable to a second position to disconnect said charging circuit means from said discharge control means and to discharge said charging circuit means; and
   safety discharge means responsive to said charging circuit means, said safety discharging means including an actuating means connected to said discharge control means, and a safety grounding terminal mounted on said actuating means, said safety ground terminal being selectively movable to a first position whereby the energy stored in said charging circuit means is discharged from said discharge terminal to said safety grounding terminal.

9. In a safety electrical energy storage apparatus, a high-energy switch comprising:
   a substantially spherical discharge terminal for receiving stored electrical energy;
   a substantially spherical output terminal for connection to an external utilization circuit;
   a substantially spherical, selectively-operable connecting terminal;
   first and second means for movably mounting said output terminal and said discharge terminal, respectively, thereby permitting the distance therebetween to be selectively varied;
   an actuating means for selectively interposing said connecting terminal between said discharge terminal and said output terminal and thereby establish a discharge path therebetween;
   a safety grounding terminal coupled to said actuating means whereby said grounding terminal is normally in engagement with said discharge terminal and is moved away from said discharge terminal in response to actuation of said actuating means; and
   a weight connected to said safety grounding terminal for normally urging said safety grounding terminal toward said discharge terminal.

10. An electrical energy storage device, comprising:

an interlock arming means for receiving electrical energy;
charging circuit means connected to said interlock arming means for storing energy received therefrom;
switching means having a discharge terminal connected to said charging circuit means, an output terminal for connection to an external utilization circuit, and a selectively-operable connecting terminal;
discharge control means operatively connected to said connecting terminal for selectively causing said switching means to discharge the energy stored in said charging circuit means into said output terminal;
a ground terminal; and
safety discharge means responsive to said charging circuit means for discharging energy stored therein to said ground terminal unless said charging circuit means is receiving energy from said interlock arming means, and including a time-delay relay means connected to said charging circuit means for disconnecting said charging circuit means from said discharge control means so as to cause the energy stored in said charging circuit means to be discharged after a predetermined length of time.

11. An electrical energy storage device as defined in claim 1 including:
a key-operated safety lock switch in said interlock arming means for rendering said charging circuit means inoperative; and
a weight connected to said safety grounding terminal for normally urging said safety grounding terminal towards said discharge terminal.

References Cited
UNITED STATES PATENTS

| | | | |
|---|---|---|---|
| 2,569,133 | 9/1951 | Podolsky | 317—12 |
| 3,075,125 | 1/1963 | McAustan et al. | 317—80 |
| 3,275,891 | 9/1966 | Swanson | 317—16 |
| 3,339,111 | 8/1967 | Possner | 317—16 |

JOHN F. COUCH, *Primary Examiner.*

R. V. LUPO, *Assistant Examiner.*

U.S. Cl. X.R.
317—80; 336—170